April 30, 1963 H. J. KRATT 3,087,284
LENS EDGING TOOL
Filed Aug. 8, 1960 3 Sheets-Sheet 1
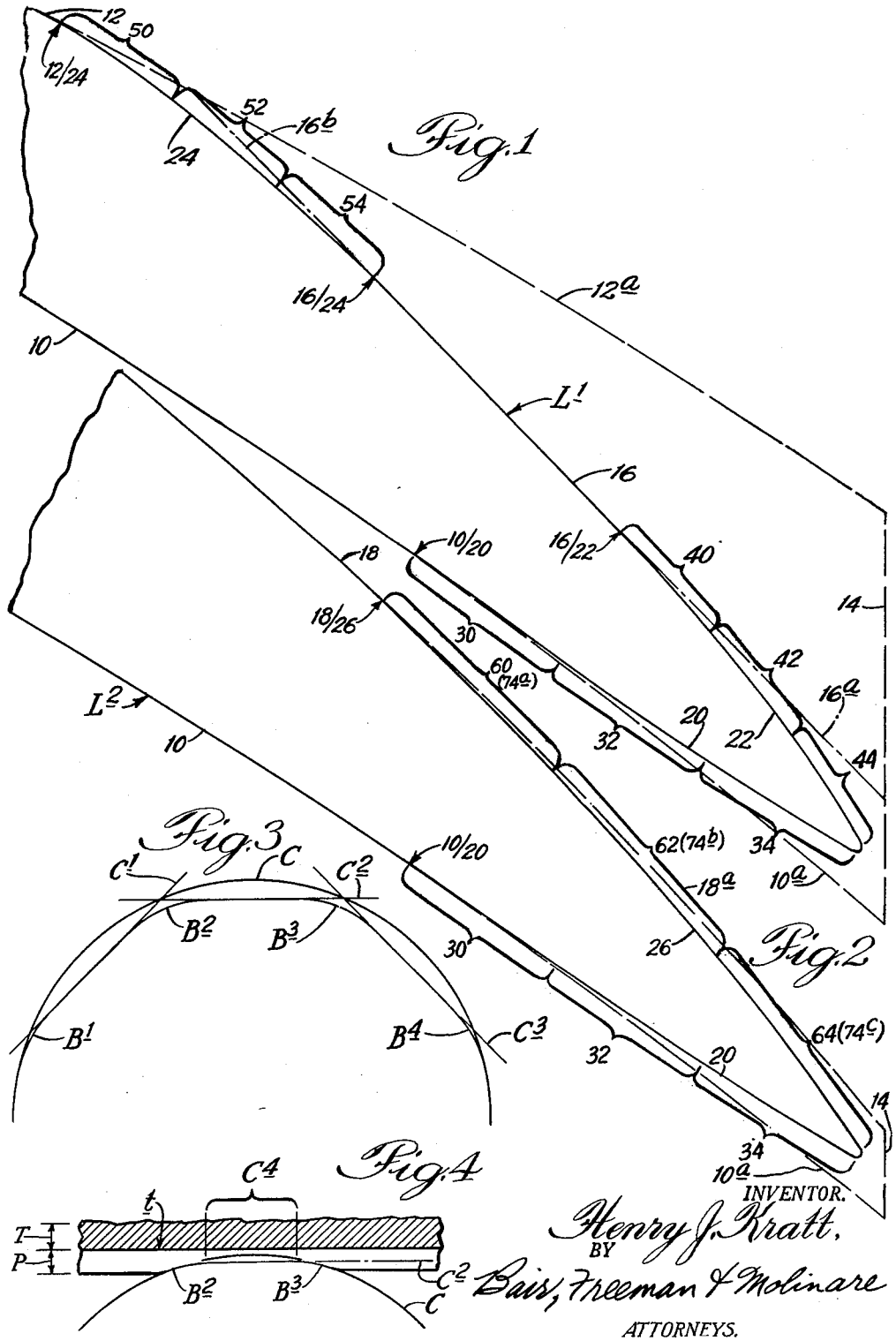
INVENTOR.
Henry J. Kratt,
BY Bair, Freeman & Molinare
ATTORNEYS.

April 30, 1963 H. J. KRATT 3,087,284
LENS EDGING TOOL
Filed Aug. 8, 1960 3 Sheets-Sheet 2
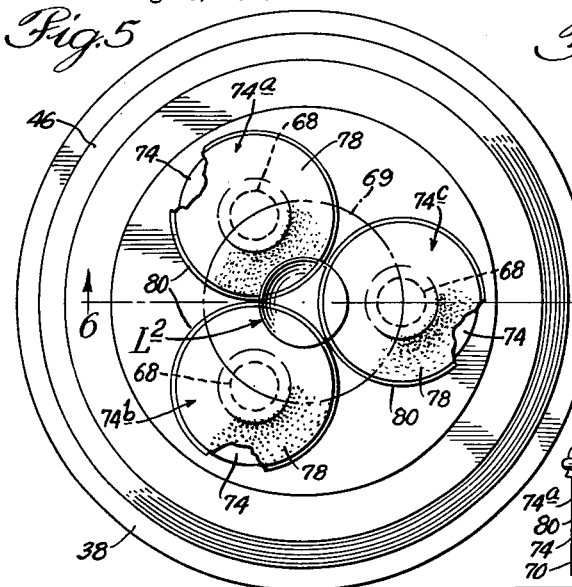
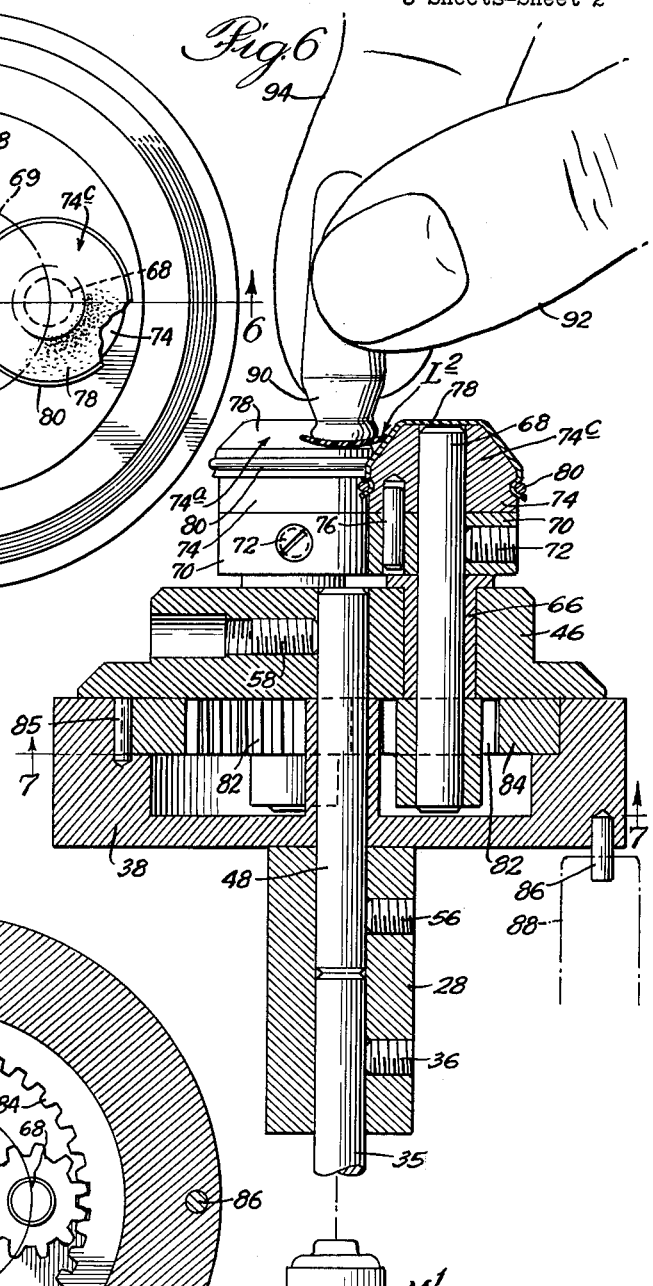
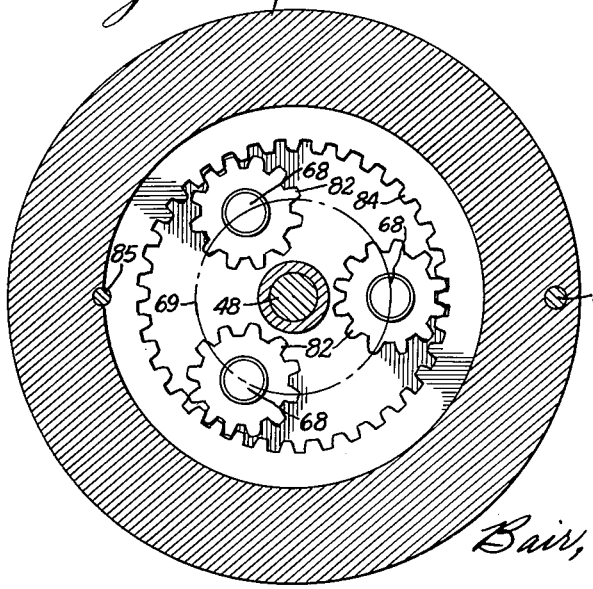
INVENTOR:
Henry J. Kratt
BY
Bair, Freeman & Molinare
ATTORNEYS.

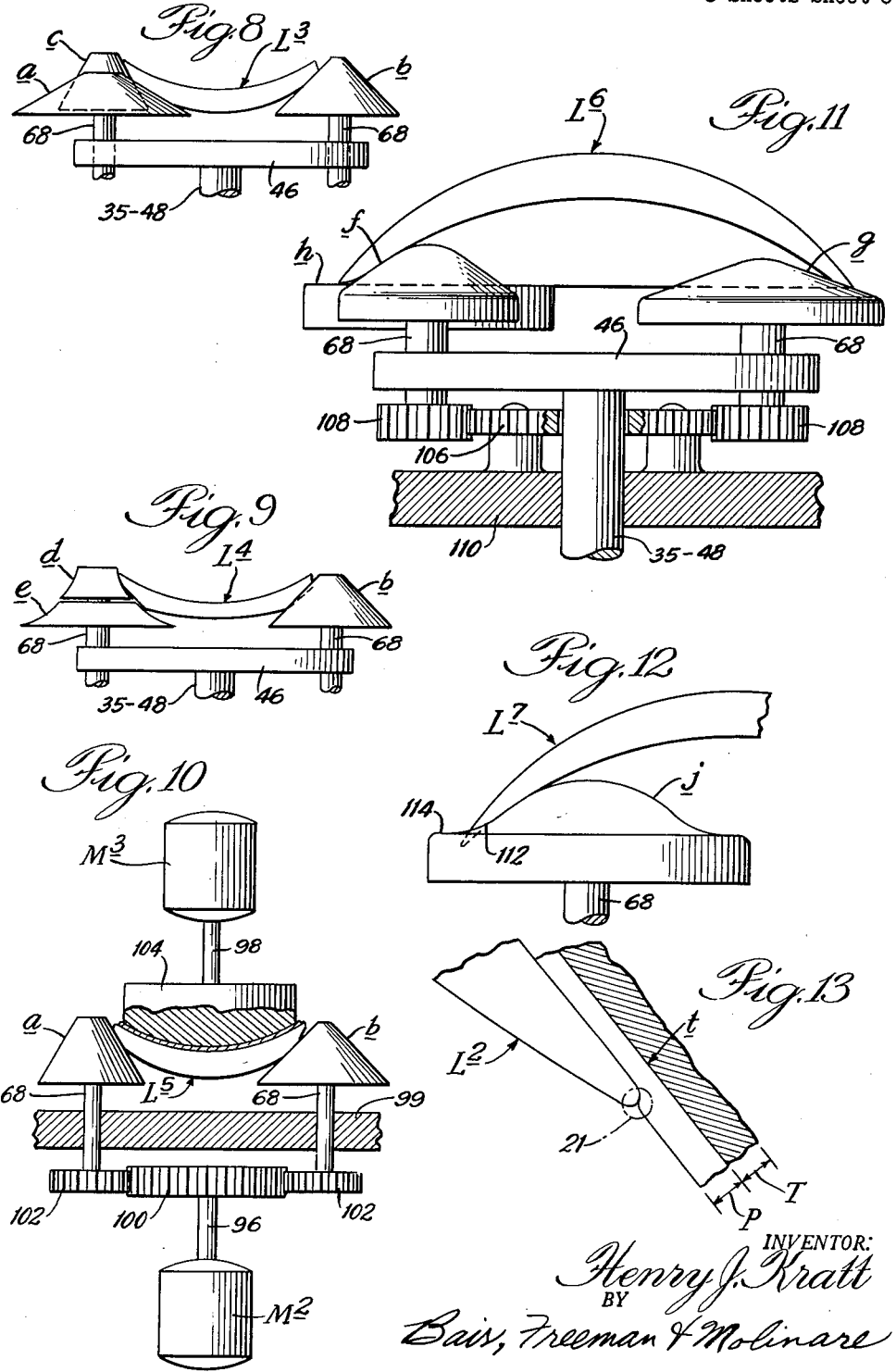

United States Patent Office 3,087,284
Patented Apr. 30, 1963

3,087,284
LENS EDGING TOOL
Henry J. Kratt, Chicago, Ill., assignor to The Plastic Contact Lens Company, Chicago, Ill., a corporation of Illinois
Filed Aug. 8, 1960, Ser. No. 48,127
7 Claims. (Cl. 51—90)

This invention relates to an "edging" tool or edge finishing tool for contact lenses.

One object of the invention is to provide an edging tool having at least three abrading elements with which a lens can be engaged whereupon the abrading elements act upon the marginal edge of the lens for rounding it and highly polishing the rounded surface, thereby applying a satisfactorily finished edge to the lens.

Another object is to provide an edging tool which may be designed for rounding posterior and/or anterior edges of a contact lens, and blending the rounded marginal edge with the base and anterior curves that form the lens surfaces, and which also rounds and polishes the terminal or peripheral edge of the lens in such manner that it does not irritate either the cornea or the eyelid.

Still another object is to provide abrading elements with which at least three circumferentially spaced radii of the lens may be simultaneously engaged while the abrading elements are being rotated relative to the lens, the angle of the lens contacting portions of the elements being preferably slightly different so as to round off a lens edge in a series of chords, the abrading surfaces being slightly concave if desired and/or being provided with resilient padding depressible under pressure to blend the transitions from one chord to the next.

A further object is to provide means for relatively rotating the tool and the lens, and means for rotating the abrading elements relative to the tool so as to accomplish the abrading action progressively around the complete circumference of the lens and thereby produce a uniform rounding off of the edges of the lens when applied to the tool.

Still a further object is to provide interchangeable abrading tools of different angle and/or curvature, and with different degrees of abrasion for cutting, grinding and/or polishing the marginal edges of the lens and thereby producing the desired finish on a semi-finished lens having a predetermined size, base curvature and anterior or power curvature.

An additional object is to provide a lens edging tool which is formed of a plurality of abrading elements so spaced that a contact lens can be seated either in them or over them, means to rotate the abrading elements, and means for rotating either the tool or the lens for progressive abrasion around the circumference of the lens.

With these and other objects in view, my invention consists in the construction, arrangement and combination of the various parts of my lens edging tool, whereby the objects above contemplated are attained, as hereinafter more fully set forth, pointed out in my claims and illustrated in detail on the accompanying drawings, wherein:

FIG. 1 illustrates a cross section of the marginal edge (approximately 1 mm. wide) of a negative contact lens at a scale of 200× to show the action of my lens edging tool thereon;

FIG. 2 is a similar sectional view of the marginal edge of a positive contact lens;

FIG. 3 is a diagrammatic representation of a curve with three chords applied thereto and blended;

FIG. 4 is a similar diagrammatic representation of a curve with one chord being applied thereto and its ends blended with the curve, the relation of an abrading tool with a resilient pad thereto being shown to illustrate the blending action;

FIG. 5 is an enlarged plan view of my lens edging tool;

FIG. 6 is a vertical sectional view thereof on the line 6—6 of FIG. 5;

FIG. 7 is a horizontal sectional view thereof on the line 7—7 of FIG. 6;

FIGS. 8, 9 and 10 are semi-diagrammatic views of modifications of the tool shown in FIGS. 5, 6 and 7, each being for edging the posterior surface of the lens, the lens being further enlarged relative to FIGS. 5 and 6, FIG. 9 showing a modified shape of abrading element, and FIG. 10 a modified means for relatively rotating the tool and lens;

FIG. 11 is a similar view, still further enlarged, of a modification for edging the anterior surface of the lens;

FIG. 12 is a view similar to a portion of FIG. 9 showing another modified form of abrading element; and FIG. 13 is a view similar to FIG. 4 showing how the terminal edge of the lens is rounded.

On the accompanying drawing, I have used the reference numeral 10 to indicate the base curve of a lens $L^1$ in FIG. 1 and also of the lens $L^2$ in FIG. 2. The represented base curves 10 are the average (7.84 mm. radius) at a scale of 200×, the lenses being of negative and positive dioptric powers respectively. The anterior or power curve of the lens $L^1$ is indicated at 12 in FIG. 1 and the anterior or power curve of the lens $L^2$ is indicated at 18 in FIG. 2. In both figures the line 14 is the size or diameter of the lens (approximately 10 mm. at the scale shown).

It will be noted that the base curves 10 have dotted extensions 10ᵃ terminating at the lens diameter 14, and the power curves 12 and 18 have dotted extensions 12ᵃ and 18ᵃ to the diameter 14. These extensions represent the original shape of the lens when it is semi-finished, that is, when cut to size and with specified base and power curves depending on the corneal curvature and the prescribed power for the lens. The represented lenses $L^1$ and $L^2$ are approximately minus 8 diopters and plus 12 diopters respectively in power.

The lengths of the lines 14 in FIGS. 1 and 2 are the edge thicknesses of the semi-finished lenses. Such edges are of course too thick and not of the proper shape to be worn in the eye. Negative lenses are usually cut down in thickness at the edge by a bevel 16—16ᵃ—16ᵇ before the lens is edged. The lenses $L^1$ and $L^2$ of FIGS. 1 and 2 are edged as indicated by the curvatures 20, 22, 24 and 26, these curvatures being the final shapes of the lens edges.

My present invention relates to a lens edging tool for reducing the surfaces 10ᵃ, 16ᵃ, 16ᵇ and 18ᵃ to the curvatures 20, 22, 24 and 26 respectively. Each curvature 20 in FIGS. 1 and 2 may for instance be broken into three chords indicated by the brackets 30, 32 and 34. I have used the reference numeral 10/20 to indicate where the curve 10 ends and the curve 20 begins. It will be noted that these brackets are substantially parallel to their corresponding parts of the curvatures 20 and are at slight angles relative to each other. If the curve 20 is formed by three straight chords, such as those produced by grindstones of the three angles indicated by the brackets 30, 32 and 34, then of course there would be somewhat abrupt transitions between the ends of the chords instead of a smooth curve. Instead of using grindstones therefore, metal elements of the three angles referred to may be used and padded with resilient padding such as felt or moleskin which is then charged with a slurry of water and Carborundum for coarse abrading, or stannic oxide powder for fine abrading or polishing, and due to the resiliency the tendency to form chords will result in blending of the edges so that a substantially smooth curve such as shown at 20 is the result.

Similarly the curvatures 22, 24 and 26 may be formed by abrading elements at the angles represented by the brackets 40, 42 and 44, the brackets 50, 52 and 54 and the brackets 60, 62 and 64 respectively.

The examples given in FIGS. 1 and 2 are merely by way of illustration and to present the problem and the desired solution. Lenses of course vary greatly in base curve, power curve and diameter, and therefore many other angles than those illustrated are required for properly edging specific lenses that differ from each other as to their curvature and size characteristics. It is believed obvious however how at least three chords such as 30, 32 and 34 may be applied to the base curve 10 of the lens $L^1$ or $L^2$ and produce the gradual curve 20 if the angular surfaces are covered with resilient padding or are slightly concave. Likewise the curvatures 22, 24 and 26 may be accomplished with abrading tools having a somewhat different combination of angles.

To illustrate the effect of resilient padding, reference is made to FIG. 3 wherein curve C representing a lens surface has been modified by chords $C^1$, $C^2$ and $C^3$. The chords have also been blended as at $B^1$, $B^2$, $B^3$ and $B^4$. In FIG. 4 a tool T having a straight rigid surface $t$ is shown with a resilient pad P attached to the surface $t$. As the pad, charged with abrasive, is applied to the lens surface C and the two relatively moved or rotated with suitable pressure applied on the pad against the lens, the portion $C^4$ of the chord $C^2$ will be formed on the lens as well as the blends $B^2$ and $B^3$ as a result of the resiliency of the pad as illustrated by the center thereof of less thickness than the ends. FIGS. 3 and 4 are of course merely illustrative and as such the curvature C and the angles between the chords are exaggerated. As for the terminal edge of the lens, FIG. 13 shows how the depressible pad P rounds the edge of the lens $L^2$ in the cross-sectional area thereof within a circle 21.

Referring to FIGS. 5, 6 and 7 I show one form of my lens edging tool suitable for applying three different angles to the anterior marginal edge of a lens such as the curvature 26 shown for the lens $L^2$ in FIGS. 4 and 6. This tool comprises a sleeve 28 which may be mounted for rotation as by set screwing it at 36 to a motor shaft 35, a motor for driving the shaft being shown diagrammatically at $M^1$. A housing 38 is mounted atop the sleeve 28, being rotatable on a rod 48 extending upwardly from the sleeve and secured therein by a set screw 56. A cover plate 46 is provided for the housing 38 and is stationary relative to the sleeve 28 by being secured to the rod 48 by a set screw 58. The housing 38 is thus rotatable around the rod 48 and under the bottom surface of the cover plate 46.

The cover plate 46 is provided with three bushings 66 in each of which is rotatably mounted an abrading element shaft 68. An abrading element carrier 70 is secured to each shaft 68 by a set screw 72. Three abrading elements 74 formed of metal are removably mounted on the shafts 68 and each is driven by a drive pin 76 extending from its respective carrier 70 and entering a socket of the abrading element. Thus the abrading elements are quickly interchangeable. In FIG. 5 the abrading elements are distinguished as $74^a$, $74^b$ and $74^c$, and in FIG. 6 the elements $74^a$ and $74^c$ are shown.

Each abrading element has a cone shaped surface covered with a resilient pad 78 which is retained in position by a retainer ring 80. A planetary pinion 82 is provided on each abrading element shaft 68 and they mesh with a ring gear 84 secured to the housing 38 by a pin 85 (FIG. 7). Rotation of the motor shaft 35 will rotate the cover plate 46 which carries with it the three abrading element shafts 68 and the shaft axes thereupon describe a circle of rotation 69 shown in FIGS. 5 and 7. The abrading elements $74^a$, $74^b$ and $74^c$ can in turn be rotated by manually grasping the housing 38 and thereby holding the ring gear 84 stationary whereupon the planetary pinions 82 will roll inside the ring gear and rotate the shafts 68. Alternatively the housing 38 may be provided with a stop pin 86 to engage a stationary stop 88 if desired so that whenever the motor shaft 35 rotates the circle of rotation 69 is described and the abrading elements continuously rotated. In some instances however it is desirable to engage a lens with the tool before starting the rotation of the abrading elements in which case the housing 38 may be left free to rotate and to be selectively stopped in its rotation by manually grasping the housing.

In FIGS. 5 and 6 I show the contact lens $L^2$ being held in engagement with the abrading elements $74^a$, $74^b$ and $74^c$, and these three elements may have for instance the angles depicted by the brackets 60, 62 and 64 respectively of FIG. 2 or any other three different angles required to suit the characteristics of the particular lens being edged. For reference purposes, the bracket numerals are followed by the abrading element numbers in FIG. 2. It will be noted the lens $L^2$ in FIG. 6 is being held on the usual type of flexible hollow vacuum type lens holder 90 with the thumb 92 and forefinger 94 of the operator grasping the lens holder as illustrated. The axis of the lens is held in alignment with the axis of the rod 48 and in some instances may advantageously be gyrated slightly about such axis during the edging of the lens.

In FIGS. 5, 6 and 7, three of the abrading elements are used and their axes are substantially parallel and spaced (circle 69 in FIG. 5) at a greater distance than the diameter of lens. The three elements 74 thereby serve as a three point seat for the lens and simultaneously engage three circumferentially spaced radial portions thereof for abrading the lens edge. The abrasion progresses around the periphery of the lens because the abrading elements are rotated by the cover plate 46 while the lens is manually held against rotation. At the same time the abrading elements are rotated independent of the cover plate 46 by means of the gearing 82—84 when the housing 38 is held against rotation. The result is reduction of the surface $18^a$ for instance in FIG. 2 to the curvature 26 within a few seconds. The abrading elements may be grinders for quick reduction after which polishing abraders are used for giving the desired smooth finish to the curvature 26, or in case not much material is to be taken from the lens a polishing action only is sufficient for accomplishing the desired result.

Since the angles represented by the chords 60, 62 and 64 in FIG. 2 and similar angles in FIG. 6 differ by only a very few degrees it is difficult to visualize the differences. Accordingly they have been exaggerated by using widely varied angles in FIG. 8 wherein the angles are indicated $a$, $b$ and $c$ (high, medium and low angles) for the three abrading elements. The lens $L^3$ accordingly is having three different angles as illustrated applied thereto, and all simultaneously. Since the axes of the abrading elements are farther from the central axis of the tool (shaft 35) than the diameter of the lens, this arrangement performs an edging operation on the anterior surface of the lens.

In FIG. 9 a modification is shown wherein the angle $b$ is again used but instead of the angles $a$ and $c$ of FIG. 8 two curved surface abrading elements $d$ and $e$ are provided. Thus a negative lens $L^4$ such as shown here the bevel angle 16 of FIG. 1 may be applied as at $b$ and the extension areas at the $16^a$ and $16^b$ ends of the bevel 16 may have applied thereto the curved-surface abrading elements $d$ and $e$, resulting in the curvatures 22 and 24 respectively of FIG. 1.

While I have shown in the previous figures a means to rotate the axes of the shafts 68 about the axis 35 (circle 69 in FIG. 5), the axes may remain stationary and the lens rotated as in FIG. 10. The abrading element shafts 68 are shown rotatable in a stationary housing 99 and the abrading elements $a$ and $b$ rotated by a gear 100 on the shaft 96 of a motor $M^2$. Pinions 102 on the shafts 68 mesh with the gear 100. The lens L⁵ is then mounted on a lens holder 104 as by means of pitch or the like and the lens holder mounted on a motor shaft 98 of a motor M³. Thus FIG. 10 illustrates another way of securing rotation between the lens being edged and the rotating abrading elements.

A lens edging tool for the base or posterior curve of the lens must of necessity have its axes 68 inside the diameter of the lens L⁶ such as illustrated in FIG. 11. Abrading elements $f$, $g$ and $h$ are illustrated of widely varying angles, the angle of $h$ being 90° to the axis of rotation or flat as obvious, and the variation between the angles being exaggerated the same as in FIG. 8 whereas in actual practice they are but a few degrees different as shown by the brackets 30, 32 and 34 in FIGS. 1 and 2. The abrading elements are shown as being rotated by pinions 108 meshing with a stationary gear 106 secured to a housing 110 of the tool.

Another possibility is shown in FIG. 12 where the abrading element $j$ has a curvature 112 terminating in a flat surface 114 at right angles to the axis of rotation. Obviously the angle at 114 must not go beyond 90° or the periphery of the abrading element will catch on the lens edge.

While I have shown and described three abrading elements it is obvious that a greater number may be provided and therefore a greater number of chords with less angular difference between them can be applied to the lens edge. At least three abrading elements however are needed and in fact I find this number preferable from the standpoint of proper "seating" of the lens with respect to the abrading elements during the abrading operation. As is well known, a three point support insures an equal distribution of pressure. The abrading effect is therefore likewise equal whereas additional supports have to be nicely adjusted all in relation to each other to secure equal distribution. Accordingly when the support is in the form of abrading elements, three of them produce maximum equality of abrasion on the lens although curvatures may be more accurately controlled with additional abrading elements providing they are correctly adjusted. In most instances however I find that three are sufficient, particularly when the abrading surfaces are padded with resilient padding and/or are curved or slightly concave as illustrated by the abrading elements $d$ and $e$ of FIG. 9 and the curvature 112 of $j$ shown in FIG. 12.

As to the character of the abrading elements they may be of steel provided with cutting teeth for cutting the lens, of emery or the like for grinding the lens, of any suitable composition for grinding or polishing, or of metal padded so that the padding can be charged with the desired grinding, abrading or polishing agent. The padding may be more or less resilient as required for properly blending the transition areas between the surfaces produced by successive abrading elements. The term "abrading" is used in a generic sense in the appended claims; cutting, grinding and polishing being merely different degrees of abrading.

As illustrated in FIGS. 8 to 12 various axial arrangements and rotation methods may be used to accomplish the desired abrading effect between the abrading elements and either the anterior or posterior edge of the lens. In all instances the lens may be edged on my lens edging tool in a minimum of time and with a maximum of smoothness to the edge surface of the lens. The quality of the polished surface is much better and more uniform than prior methods where the lens is applied to a single abrading element at one time and successively to different abrading elements of progressively different angle or curvature.

Some changes may be made in the construction and arrangement of the parts of my lens edging tool without departing from the real spirit and purpose of my invention, and it is my intention to cover by my claims any modified forms of structure or use of mechanical equivalents which may reasonably be included within their scope.

I claim as my invention:

1. In a contact lens edging tool, three abrading elements, mounting means for rotably mounting all three of said abrading elements, each on its own axis, and means for rotating said mounting means, each of said abrading elements having a cone-shaped surface, said surfaces being at different angles relative to the axis of rotation of said mounting means and provided with padding which is depressible under pressure.

2. In a contact lens edging tool, three abrading elements, mounting means for rotatably mounting said abrading elements on substantially parallel axes, and means for rotating said mounting means, each of said abrading elements being provided with a surface which is at an angle to the axis of rotation of said mounting means with all three of said angles differing from each other.

3. In a contact lens edging tool, abrading elements, means for mounting said abrading elements for rotation on substantially parallel axes, means for rotating said mounting means, and means for rotating said abrading elements relative to said mounting means each of said abrading elements being generally cone shaped but slightly concave in the portions thereof which engage the contact lens and provided with padding which is depressible under pressure.

4. In a contact lens edging tool, abrading elements, means for mounting said abrading elements for rotation on substantially parallel axes, means for rotating said mounting means, and means for rotating said abrading elements relative to said mounting means, each of said abrading elements being generally cone shaped but slightly concave in the portions thereof which engage the contact lens.

5. In a contact lens edging tool, three abrading elements, means for rotatably mounting said abrading elements, each on its own axis, and means for rotating said mounting means, said axes being outside the diameter of the lens when the lens is contacted with said abrading elements, said abrading elements being generally cone shaped but slightly concave in the portions thereof which engage the contact lens, and provided with resilient padding which is depressible under pressure.

6. In a contact lens edging tool, three abrading elements, mounting means therefor, means for rotating said abrading elements relative to said mounting means, and means for rotating said mounting means, the axes of rotation of said abrading elements being outside the diameter of the lens when the lens is contacted with said abrading elements, said abrading elements being generally cone shaped but slightly concave in the portions thereof which engage the contact lens.

7. In a contact lens edging tool, at least three abrading elements, means for mounting said abrading elements for rotation, means for rotating said mounting means, the axes of rotation of said abrading elements being inside the diameter of the lens when the lens is contacted therewith whereby they abrade the posterior edge of the lens, each of said abrading elements being generally cone shaped but slightly concave in the portions thereof that engage the contact lens.

References Cited in the file of this patent

UNITED STATES PATENTS

| | | |
|---|---|---|
| 2,017,532 | Elter et al. | Oct. 15, 1935 |
| 2,177,644 | Finke | Oct. 31, 1939 |
| 2,511,831 | Adamson | June 20, 1950 |
| 2,822,647 | Rips et al. | Feb. 11, 1958 |
| 2,990,664 | Cepero | July 4, 1961 |